United States Patent
Willyoung

Patent Number: 5,808,386
Date of Patent: Sep. 15, 1998

[54] LOW STRESS LIQUID COOLED GENERATOR ARMATURE WINDING

[76] Inventor: David M. Willyoung, 12 Harmon Rd., Scotia, N.Y. 12302

[21] Appl. No.: 794,340

[22] Filed: Feb. 3, 1997

[51] Int. Cl.$^6$ ..................................................... H02K 9/00
[52] U.S. Cl. .............................. 310/52; 310/54; 310/58; 310/59; 310/60 A
[58] Field of Search .................................. 310/52, 54, 58, 310/59, 60 A

[56] References Cited

U.S. PATENT DOCUMENTS

| | | | |
|---|---|---|---|
| 2,664,512 | 12/1953 | Huntley | 310/54 |
| 4,037,312 | 7/1977 | Deis | 29/598 |
| 4,151,433 | 4/1979 | Flick | 310/54 |
| 4,160,926 | 7/1979 | Cope et al. | 310/215 |
| 4,282,450 | 8/1981 | Eckels | 310/52 |

FOREIGN PATENT DOCUMENTS

| | | | |
|---|---|---|---|
| 888279 | 9/1981 | Russian Federation | 310/54 |
| 1093862 | 10/1966 | United Kingdom | 310/54 |

*Primary Examiner*—Thomas M. Dougherty
*Assistant Examiner*—Elvin G. Enad
*Attorney, Agent, or Firm*—William C. Crutcher

[57] ABSTRACT

A liquid cooled armature winding for a dynamoelectric machine having rectangular hollow cooling strands, wherein the cooling conduit is bounded by a continuous wall of varying wall thickness designed to minimize stress due to cyclical forces on the strand walls. Conduits of elliptical and rhomboidal cross-section are disclosed.

3 Claims, 1 Drawing Sheet

LOW STRESS LIQUID COOLED GENERATOR ARMATURE WINDING

BACKGROUND OF THE INVENTION

This invention relates to large dynamoelectric machines with internal cooling systems, and more particularly to large generators having liquid cooled armature windings.

Large dynamoelectric machines, such as turbine-generators require internal cooling of the rotor and stator windings and other parts of the machine. Rotor windings have preferably been cooled by gaseous coolants using fans or coolant picked up from the gas gap by pumping action of the rotor. Armature windings, which are the stationary high voltage windings disposed in slots in the laminated armature core, have been cooled internally both by gaseous coolants and by liquids, as disclosed in U.S. Pat. No. 2,695,368 to C. E. Kilbourne.

When the coolant is a liquid, it must be transported in a sealed conduit with no possibility of leakage. Liquid cooled windings are disclosed in U.S. Pat. No. 3,075,104 to D. M. Willyoung et al., issued Jan. 22, 1963 utilizing conduits of circular cross section extending longitudinally inside the strands of the field winding on the rotor, and in U.S. Pat. No. 3,049,633 issued Aug. 14, 1962 to Bernard M. Cain, utilizing conduits of rectangular cross section extending longitudinally inside the strands of the armature winding in the stator core.

The armature windings of a large turbine generator are normally made up of "strands" of rectangular cross section stacked in an array of rows and columns and surrounded by a sheath of high voltage ground insulation. The strands of the armature bars in the slots are short circuited at either end of the core where they are connected to series clips, which supply liquid to the hollow strands. The strands are usually transposed, in order to balance the voltage differences between strands in the top and bottom of each of the armature bars, using one of the well known transpositions, such as the one in my U.S. Pat. No. 3,118,015 issued Jan. 14, 1964.

A prior art construction for a liquid cooled generator armature winding employs rectangular strands with hollow cooling strands interspersed among solid strands in a transposed armature bar, as seen in FIG. 1. The wall thickness of the hollow cooling strand is substantially uniform as seen in the enlarged view of FIG. 2. The walls of the hollow strands are subjected to repetitive cyclical forces brought about by the interaction between the changing magnetic flux in the armature core as the rotor turns, and the currents flowing in the strands. These forces create corresponding repetitive cyclical stress in the walls of the hollow strands which, over a long period of time, could lead to cracking or rupture of the strand walls by fatigue and leakage of the liquid coolant.

Accordingly, one object of the present invention is to provide an improved liquid cooled generator armature winding with reduced stress in the walls of the hollow strands.

Another object of the present invention is to provide an improved low stress liquid cooled generator armature winding for an armature bar with rectangular strands.

SUMMARY OF THE INVENTION

Briefly stated, the invention is practiced by providing an improved liquid cooled armature winding for a dynamoelectric machine, comprising strands insulated from one another and surrounded by a sheath of ground insulation, each of the strands being substantially rectangular in cross section with a width and a depth, the width being greater than the depth. The strands extend longitudinally along the winding and are disposed in an array of rows and columns and transposed along the winding to shift their relative positions in the array, selected strands each defining a longitudinal conduit within the strand adapted to conduct cooling liquid through the strand to cool the armature winding.

Selected strands each have a cross section wherein the longitudinal conduit is bounded by a continuous wall of varying wall thickness. The continuous wall has a selected minimum wall thickness located at the midpoints of the width dimensions and at the midpoints of the depth dimensions of the strand. Preferably the conduit has an elliptical cross-section.

DRAWING

The subject matter which is regarded as the invention is particularly pointed out and distinctly claimed in the concluding portion of the specification. The invention, however, both as to organization and method of practice, together with further objects and advantages thereof, may best be understood by reference to the following description, taken in connection with the accompanying drawing, in which:

FIG. 1 is an elevational view, in cross section, taken through a prior art liquid cooled armature bar, FIG. 2 is an enlarged elevational view, in cross section, through a single liquid cooled strand of the prior art armature bar of FIG. 1, FIG. 3 is an elevational view, in cross section, taken through an improved liquid cooled armature bar according to a preferred embodiment of the present invention, FIG. 4 is an enlarged elevational view, in cross section, taken through a single liquid cooled strand of the improved armature bar of FIG. 3, and FIG. 5 is an enlarged elevational view, in cross section, taken through a single liquid cooled strand illustrating a modified form of the invention.

DESCRIPTION OF THE PREFERRED EMBODIMENT OF THE INVENTION

Figure 2:
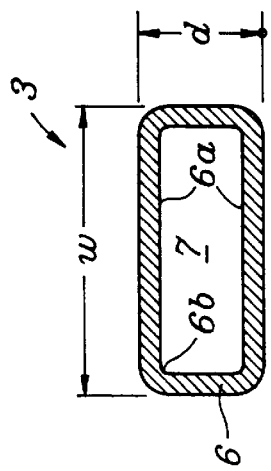
Figure 1:
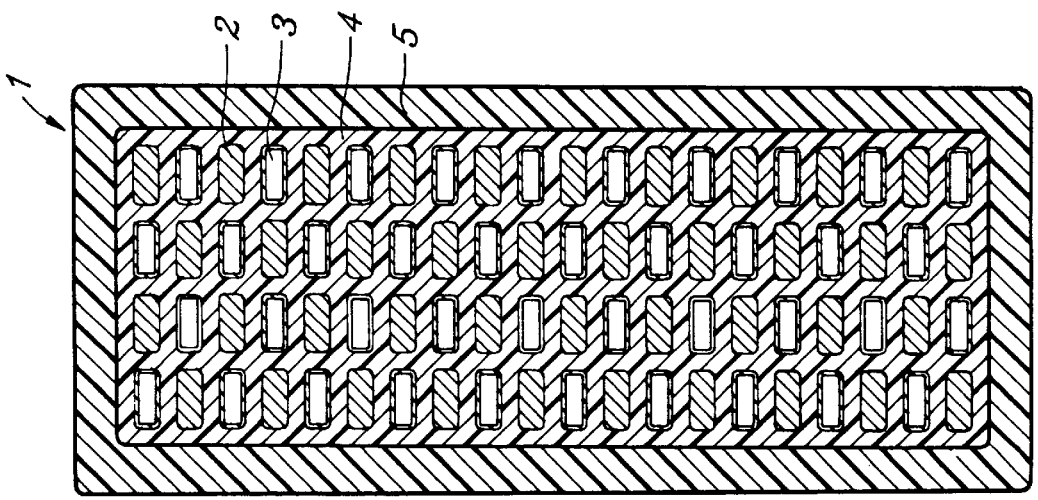

Referring now to FIGS. 1 and 2 illustrating the prior art, an armature bar, shown generally at 1, is shown in cross section. Armature bar 1 represents either a top bar or bottom bar which is disposed in one of a number of circumferentially disposed slots in the laminated core of a dynamoelectric machine. The armature bars are connected together at the opposite ends thereof by end windings, and the strands are connected together at opposite ends by series clips, which also provide for insulated hoses and means to conduct liquid coolant to and from the passages in the armature bar 1. The described structure is not shown, since systems for doing this are well known in the art and disclosed in the aforementioned Kilbourne and Cain patents which are incorporated herein by reference.

Armature bar 1 comprises an array of solid strands 2 and hollow strands 3 disposed in an array of rows and columns with the hollow strands 3 interspersed among the solid strands 2. Strands 2 and 3 are insulated from one another and from adjacent strands by strand insulation represented at 4. Strand insulation 4 is actually separately applied to the strands but is indicated as a common insulation mass in order to simplify the drawing. The strands are transposed as they move along the armature bar shifting positions within the bar at each transposition, as indicated in the aforementioned U.S. Pat. No. 3,118,015. The array of strands is surrounded by a sheath of ground insulation indicated at 5.

A suitable method for making such an armature bar is illustrated in U.S. Pat. No. 3,050,787 issued Aug. 28, 1962 to C. D. Richardson et al.

An enlarged hollow strand 3 omitting the strand insulation is shown in the cross sectional view of FIG. 2 representative of the prior art. Strand 3 is substantially rectangular in cross section and has a width dimension w which may be on the order of 0.180 inches and a depth dimension d which may be on the order of 0.090 inches. The width is therefore significantly greater than the depth, or having an aspect ratio of 2 to 1 in this case. A larger strand found in the prior art might have a width of 0.375 inches and a depth of 0.188 inches. Strand 3 has a continuous wall 6 of substantially uniform thickness, perhaps on the order of 0.030 inches and is normally manufactured by extruding conductive metal such as high strength copper through a die. Wall 6 surrounds and defines a longitudinal conduit 7 of rectangular cross section within the strand, which is adapted to conduct cooling liquid through the strand so as to cool the armature winding.

The wall portions 6a across the longer dimension w are subject to repetitive cyclical forces, creating fatigue stresses within the walls which are particularly prevalent at the corners 6b.

Figure 3:
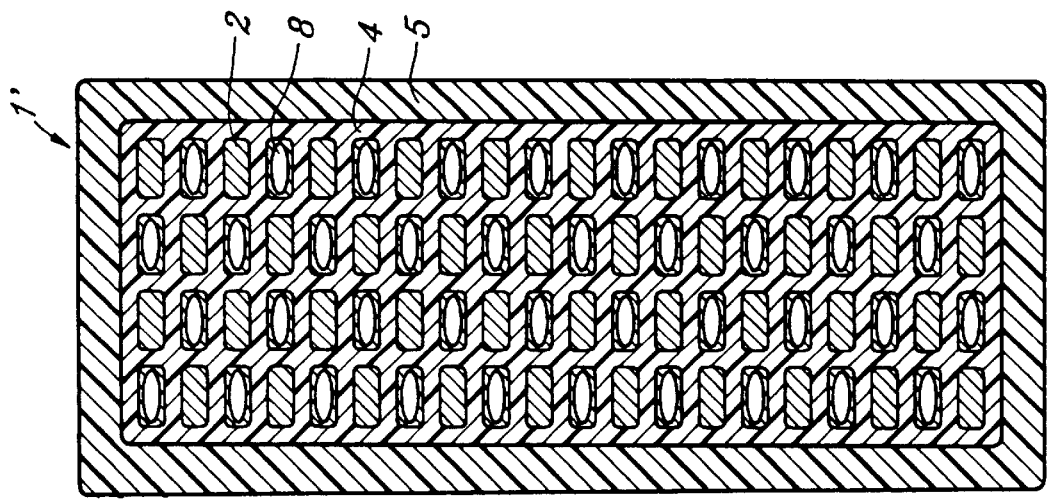

Referring to FIG. 3 of the drawing, a preferred embodiment of an improvement is shown according to the present invention. Armature bar 1 is identical to the previously described armature bar 1, with the exception of the hollow strands indicated by reference numeral 8. In this case, hollow strands 8 have a modified cross section, as more clearly illustrated in the enlarged strand shown in FIG. 4.

Figure 4:
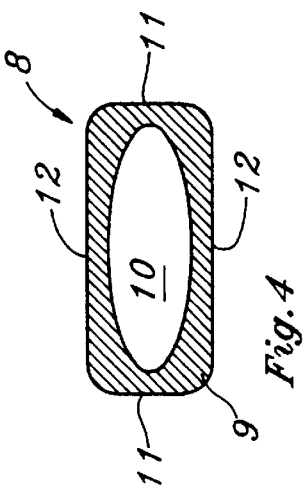

FIG. 4 illustrates the strand 8 having a rectangular outside surface of a width w greater than its depth d as before. The dimensions w and d may be identical to those in FIG. 2. The improvement comprises a continuous wall 9 of varying wall thickness designed to minimize stress in the strand wall without substantially affecting the flow passage for the liquid coolant. In the preferred embodiment, the continuous wall of varying wall thickness has an inner surface which bounds an internal conduit 10 of elliptical cross section. The major axis of the ellipse extends parallel to the width dimension w and its opposite ends terminate to define points of minimum wall thickness 11 located at the midpoints of the depth dimensions d. Similarly, the minor axis of the ellipse extends parallel to the depth dimension d and its opposite ends terminate to define points of approximately the same minimum wall thickness 12 located at the midpoints of the width dimensions w of the strand.

Figure 5:
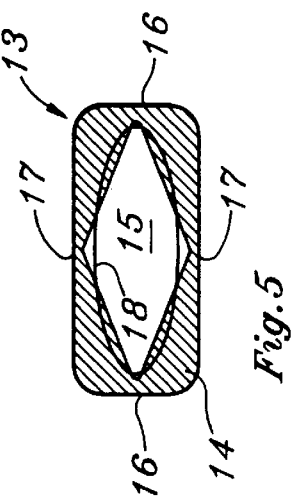

Reference to FIG. 5 of the drawing illustrates a modified form of the invention. A hollow strand 13 is shown in cross section having a continuous wall of varying thickness 14 having an inner surface bounding an internal conduit 15 in the shape of a rhombus. The rhombus has four sides, which intersect at two opposed points 16 located at the midpoints of the depth dimensions and two opposed points 17 located at the midpoints of the width dimensions. The points 16, 17 indicate locations of minimum wall thickness, which minimum thickness may be selected by practical considerations. A suitable minimum wall thickness, which will withstand handling during the transposition and armature bar manufacturing process, is 0.030 inches, or possibly slightly less.

While a rhombus is actually an equilateral parallelogram with four sides intersecting with sharp angles at points 16, 17, the intersections are normally filleted to facilitate manufacture using the extrusion process, and also to reduce stress. Therefore a conduit in the shape of a rhombus is defined herein as a rhombus modified by suitable fillets at the four intersections. A rhombus so modified is similar to an ellipse. Preferably, then, in order to provide a cooling conduit, an ellipse 18 having the same cross sectional area may be substituted for the rhombus.

While the forces to which the strands are subjected are very complex and the manner of supporting the strands within the array is complicated, and while I do not intend to be bound by any theoretical explanations, the basis for the rhomboid shape, which is approximated by an ellipse, is as follows. It is known from theories of strength of materials that beams of varying cross section may be designed to provide beams of uniform strength in bending, according to the type of loading imposed upon them and according to the way they are supported. If the top (long) leg of the hollow strand of FIG. 5 is considered as a beam fixed at both ends with the load uniformly distributed over its length, then a beam with a varying cross section can be designed to provide a beam of uniform strength. A beam so designed will vary from a maximum depth at the ends to zero depth in the middle of the beam. A cross section in elevation takes the form of the two triangles shown and will provide uniform strength in bending. It is then modified at point 17 by adding a minimum wall thickness to provide strength in shear. A similar design approach for achieving a low stress winding may result in other shapes, such as a parabolic, depending upon the assumed loading and type of support.

A low stress liquid cooled generator armature winding has therefore been described which reduces the bending stresses at the corners of the rectangular cooling strands without substantially affecting the cooling of the armature winding. The improved liquid cooled generator armature winding according to the present invention is more reliable and less likely to failure than prior art liquid cooled generator windings.

While there has been described what is considered to be the preferred embodiment of the invention, other modifications will occur to those skilled in the art, and it is desired to secure in the appended claims all such modifications as fall within the true spirit and scope of the invention.

I claim:

1. An improved liquid cooled armature winding for a dynamoelectric machine, comprising a plurality of strands insulated from one another and surrounded by a sheath of ground insulation, each of said strands having an outside surface and being substantially rectangular in cross section with a width dimension having a midpoint and a depth dimension having a midpoint, said width dimension being greater than said depth dimension, said plurality of strands extending longitudinally along the winding and being disposed in an array of rows and columns and transposed along the winding to shift their relative positions in the array, selected strands each defining a longitudinal conduit with an inner surface within the strand adapted to conduct cooling liquid through the strand to cool the armature winding, the improvement comprising:

said selected strands each having a cross section wherein said longitudinal conduit is bounded by a continuous wall having an inner surface, said continuous wall being of varying wall thickness, said continuous wall having a selected minimum wall thickness located at the midpoints of the width dimensions and at the midpoints of the depth dimensions of the strand, and wherein the continuous wall varies in thickness so as to provide substantially uniform strength in bending of the strand continuous wall across the width dimension of the strand.

2. The improvement according to claim 1, wherein the inner surface of said continuous wall has the shape of an ellipse having the ends of its major and minor axes uniformly spaced from the strand outside surface at said midpoints.

3. The improvement according to claim 1, wherein the inner surface of said continuous wall has the shape of a rhombus, having four sides meeting at intersections, each one of said intersections being substantially equally spaced from the strand outside surface at a respective one of said midpoints.

\* \* \* \* \*